United States Patent Office 2,968,290
Patented Jan. 17, 1961

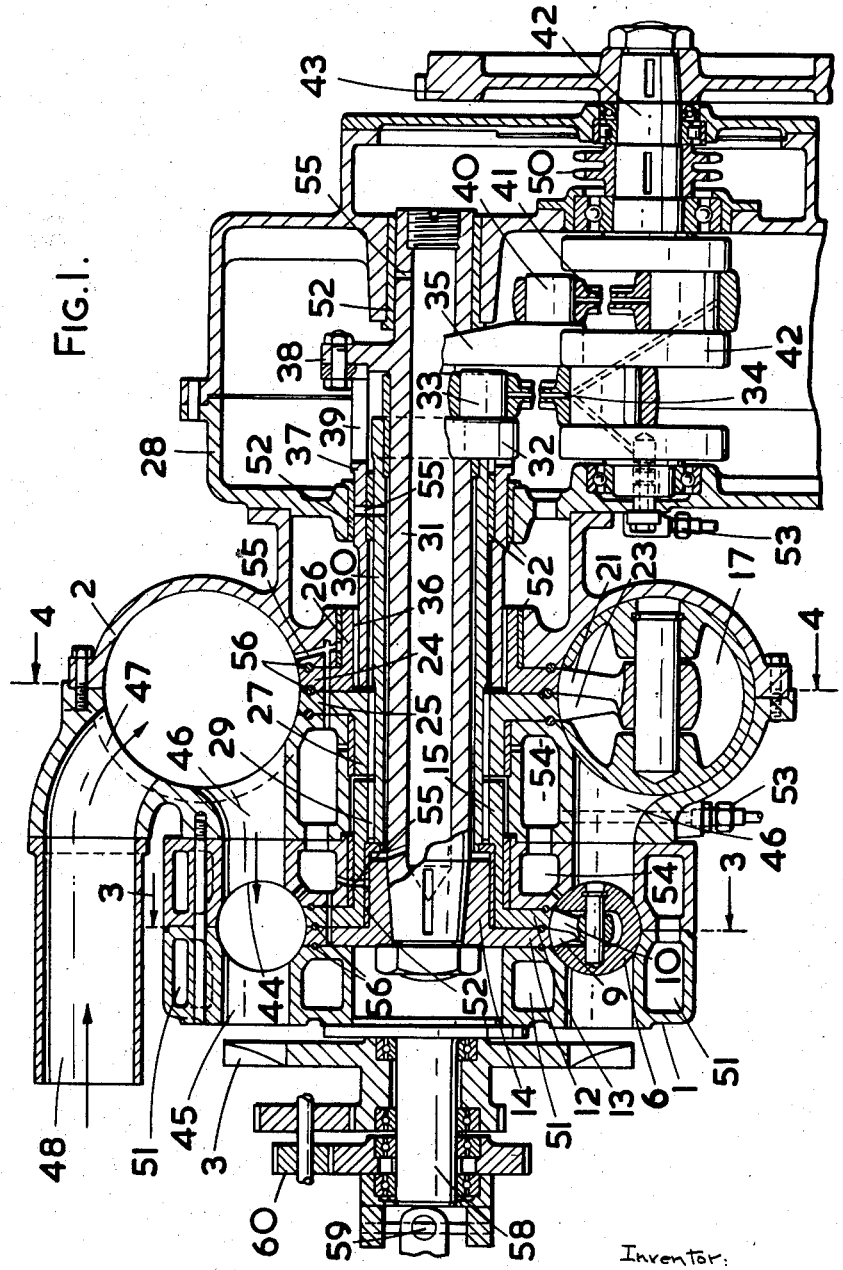

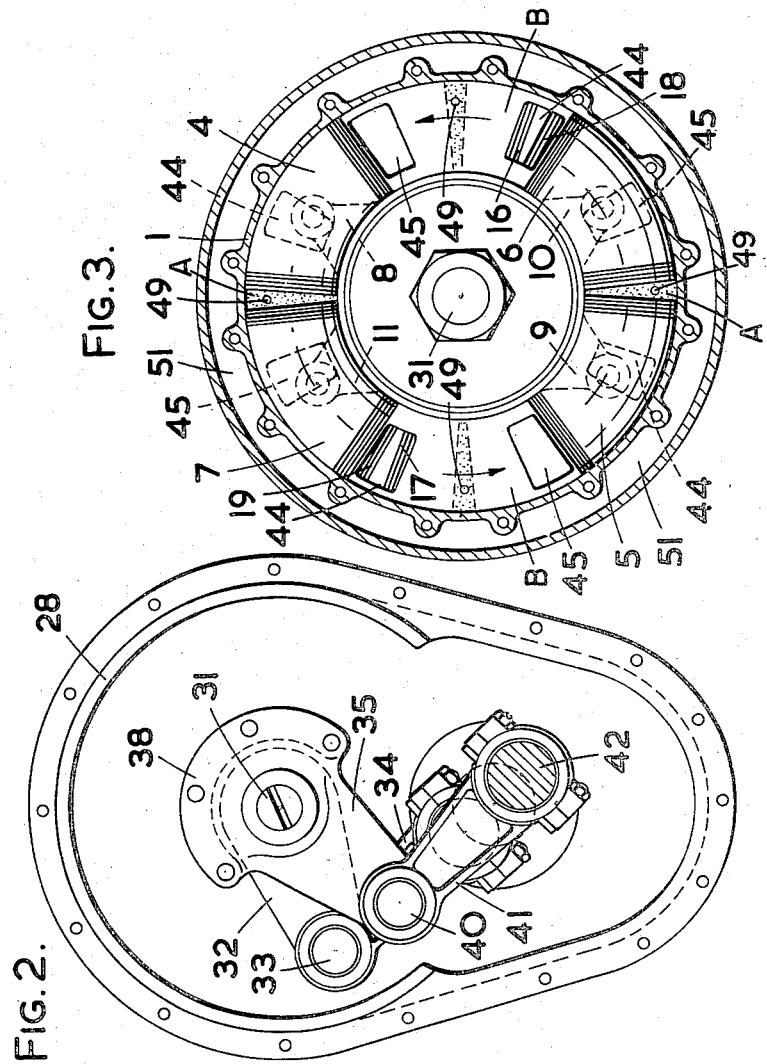

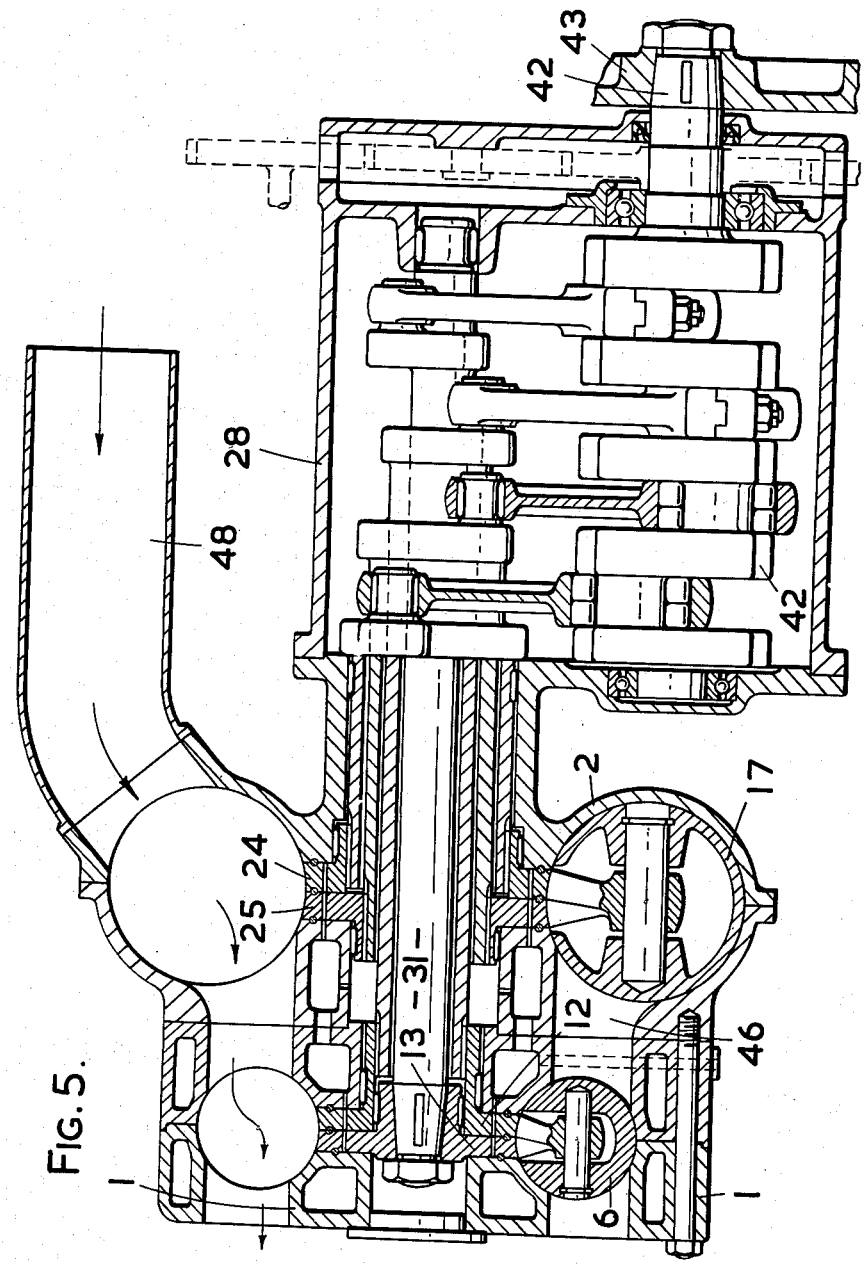

2,968,290
GAS GENERATORS

Granville Eastwood Bradshaw, Leatherhead, England, assignor to Bromega Limited, London, England, a British company Filed May 22, 1957, Ser. No. 660,922

Claims priority, application Great Britain May 22, 1956

4 Claims. (Cl. 123—18)

The invention relates to gas generators and particularly to gas generators of the "free-piston" type.

Known gas generators of this type suffer from the disadvantage that whilst they are economical when used in ships they are unsuitable for motor car propulsion, since their dimensions and weight are out of proportion to the horsepower delivered and, by their fundamental characteristics are constant speed slow-motion units devoid of flexibility which is a disadvantage in a motor car engine.

A further disadvantage is that in known "free-piston" generators the pistons are forced apart by an explosion and are thrown back to their original position by pockets of compressed air which are formed in the ends of the cylinder. This operation does not allow the generator to operate at "tick-over" and slow speeds. Furthermore, the operation of such generators is such that the gases which are passed to the gas turbine are supplied from a "build-up" of compressed air in an air chamber, which air is released when the pistons are blown apart. Thus, no direct means are provided to force the gases through the exhaust ports to the gas turbine.

It is among the objects of the invention to avoid these disadvantages, and to provide a gas generator, particularly for use in motor cars, commercial vehicles, helicopters and the like, which is reliable, light in weight, compact and has the minimum number of moving parts.

A further object of the invention is to provide a gas generator which can operate from a "tick-over" speed to a speed of several thousands r.p.m. with little or no risk of mis-firing.

A still further object of the invention is to provide means whereby the exhaust gases are forced under direct mechanical compression through the exhaust ports to the gas turbine.

According to the invention there is provided a gas generator having an air compressor and an internal combustion engine mechanically connected to drive the compressor and to receive its air for combustion from the compressor, the exhaust gases from the engine constituting the generated gas, the compressor comprising a toroidal cylinder having inlet ports for introducing air to the cylinder and outlet ports, four pistons oscillatably disposed in the cylinder, a first member oscillatable about the axis of the toroidal cylinder, means connecting one pair of opposite pistons to said first member, a second member oscillatable about the axis of the toroidal cylinder, means connecting the other pair of opposite pistons to said second member, and connections between the internal combustion engine and said first and second members whereby when the engine is in operation the first and second members are rocked in opposite directions at the same time so that the pistons oscillate in the cylinder drawing air in by way of the inlet ports and forcing compressed air out by way of the outlet ports to said internal combustion engine.

The invention is diagrammatically illustrated by way of example in the accompanying drawings in which:

Figure 1 is a section through a gas generator according to the invention,

Figure 2 is an end view showing the connecting rods and the crank-shaft,

Figure 3 is a section on the line 3—3 of Figure 1,

Figure 5 is a section through a modified construction of a gas generator according to the invention.

Figure 4:
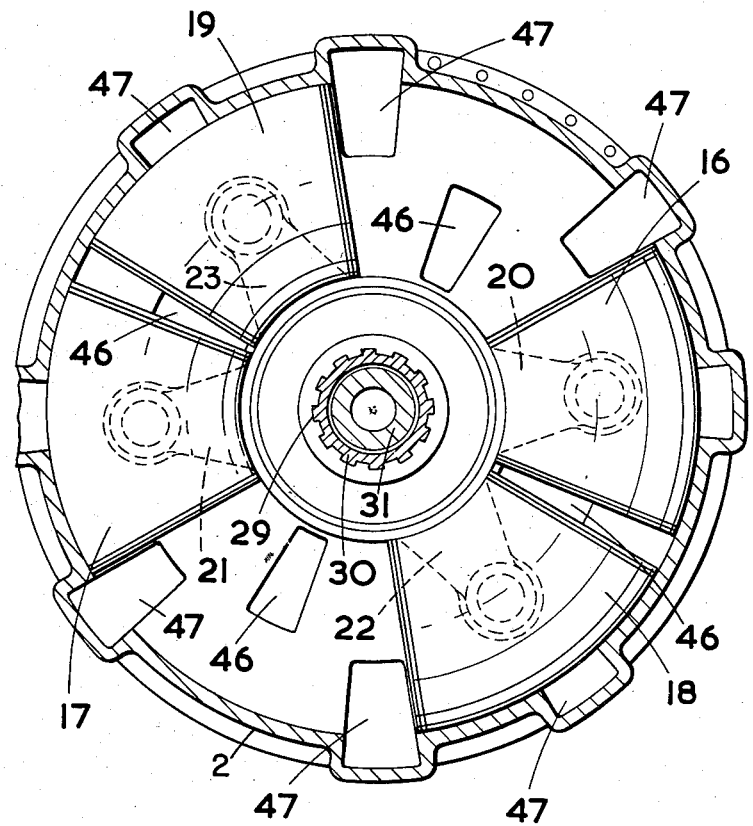
Figure 4 is a section on the line 4—4 of Figure 1.

In carrying the invention into effect according to the construction illustrated in the drawings, a gas generator comprises a stationary annular two-stroke diesel cylinder 1 which is adapted to operate a stationary annular air-compressor cylinder 2 to drive a gas turbine 3. The cylinder 2 is aproximately four to five times the cubic capacity of the cylinder 1. The toroidal circumference, as defined by the circle comprised of the cross-sectional midpoints of the toroid, is greater than the toroidal circumference of cylinder 1.

Mounted within the cylinder 1 are two pairs of double-headed pistons 4, 5 and 6, 7 (Fig. 3) which are pivotally mounted at diametrically opposite positions on rocking arms 8, 9 and 10, 11 (Fig. 3) respectively. The rocking arms 8, 9 and 10, 11 are formed integral with discs 12 and 13 (Fig. 1) respectively which are themselves formed integral with sleeves 14 and 15 (Fig. 1). The pistons are provided of cast iron or other heavy material so as to absorb explosion pressures and thereby reduce the internal stresses.

The annular cylinder 1 is split circumferentially to form two halves which are bolted together, an annular slot being formed on the inner lesser diameter through which the arms 8, 9, 10 and 11 extend.

The compressor cylinder 2 (Fig. 1) is similarly provided with two pairs of double-headed pistons 16, 17 and 18, 19 (Fig. 4) which are pivotally mounted at diametrically opposite positions on rocking arms 20, 21 and 22, 23 (Fig. 4) respectively. The rocking arms 20, 21 and 22, 23 are formed integral with discs 24 and 25 (Fig. 1) respectively which are themselves formed integral with sleeves 26 and 27 (Fig. 1).

The cylinder 1 is secured by means of bolts to the cylinder 2, and the cylinder 2 is secured by means of bolts to a stationary crank-case 28 (Fig. 1).

The sleeves 15 and 27 are secured by means of splines 29 (Fig. 1) to a sleeve 30 which is adapted to rotate about a shaft 31. The sleeve 30 extends into the crank-case 28 and is provided with a crank arm 32 (Figs. 1 and 2) having a pin 33 on which the small end of a connecting rod 34 is mounted.

The sleeve 14 is splined onto the shaft 31 which is formed at one end with a crankcase 28, with a crank arm 35 (Figs. 1 and 2). The sleeve 26 is secured by means of splines 36 to a sleeve 37 which is adapted to rotate about the sleeve 30. One end of the sleeve 37 extends into the crank-case 28 and is secured to a flange 38 provided in the crank arm 35. The sleeve 37 is formed with a slot 39 to permit relative movement between it and the sleeve 30.

The crank arm 35 is provided with a pin 40 on which the small end of a connecting rod 41 is mounted.

The big ends of the connecting rods 34 and 41 are connected to a two-throw crank-shaft 42 on one end of which is mounted a fly wheel 43 (Fig. 1).

Thus it will be understood that the pistons in the diesel cylinder 1 are interconnected with the pistons in the air compressor cylinder 2 so that in operation the pistons 4, 5 serve to operate the pistons 18, 19. The crank-shaft 42 serves no other purpose than to provide a drive for auxiliary mechanisms such as a fuel pump, a water pump and an oil pump. In addition, the crank-shaft supports the fly wheel 43 which may be provided with electric starter gearing and which also assists in the smooth running of the generator when running at "tick-over" speeds.

The diesel cylinder 1 is formed with four air inlet ports 44 (Figs. 1 and 3) and four exhaust ports 45. The inlet ports 44 are connected by transfer ports 46 (Figs. 1 and 4) to the air compressor cylinder 2. The transfer ports 46 may be slanting and tangential so that the gas spins from the inlet end to the outlet end of the part of the cylinder concerned thereby preventing "buffeting" of the gases which might reduce the velocity.

Air is drawn into the cylinder 2 through four pairs of intake ports 47 (Figs. 1 and 4) which are formed with lengths of pipe 48 (Fig. 1) which serve to provide a "ram-effect" for the air entering the cylinder.

Furthermore the cylinder 1 is provided with four fuel jets 49 (Fig. 3) which are adapted to operate in pairs and are controlled by any suitable known control means for the purpose hereinafter described.

The sequence of operations is as follows:
In the position shown in Figures 3 and 4 chambers A are formed between the pistons 4 and 7 and between pistons 5 and 6, and at the same time air is being drawn into the combustion chambers B through the inlet ports 44 thereby forcing exhaust gases out through the exhaust ports 45. At the appropriate moment fuel is passed into the combustion chambers A through the jets 49 and combustion occurs in both chambers A simultaneously thereby forcing the pistons 4 and 7 and 5 and 6 apart. This action causes the pistons to cut off the air inlet ports and exhaust ports of the combustion chambers B and to open the air inlet ports and exhaust ports of the combustion chambers A, thus allowing the exhaust gases from the chambers A to be forced under pressure into the gas turbine 3 and simultaneously causing the pistons 5 and 7, and 4 and 6 to come together to compress the air in the chambers B whereby simultaneous combustion takes place in the two chambers B which forces the pistons 5 and 7 and 4 and 6 apart so that they assume their previous position. This cycle of operations is then repeated.

It will be seen therefore that each piston is caused to "float" in a rocking motion between two combustion chambers in such manner that they are forced by the explosion in both directions and are not dependent upon a pocket of compressed air to force them in one direction as in known generators of the "free piston" type. Furthermore, since the pistons are forced in both directions it permits the generator to run at "tick-over" speed, which is not possible with the known types.

Since the pistons 4, 5 and 6, 7 of the cylinder 1 are connected to the pistons 16, 17 and 18, 19 respectively of the cylinder 2 the movements of the pistons in the cylinder 1 are transmitted to the pistons in the cylinder 2. The pistons of the cylinder 2 are so mounted with respect to the pistons of the cylinder 1 that when the pistons 4, 7 and 5, 6 reach maximum compression in the combustion chambers A, the cylinders 16, 18 and 17, 19 reach maximum compression at a position adjacent to the inlet ports 44 of the combustion chambers B, as is clearly shown in Figures 3 and 4. In this position therefore, the transfer ports 46 which serve to feed air into the combustion chambers A are closed by the pistons 4 and 5 and air is being drawn through the two pairs of intake ports 47 which serve the combustion chambers B. Thus, it will be understood that the diesel cylinder 1 operates the air compressor cylinder 2 thereby forcing compressed air into the combustion chambers of the cylinder 1 which in turn forces the exhaust gases to the gas turbine 3.

The crank-shaft 42, which is driven by the cylinder 1 through the shaft 31 and the sleeve 30, may be provided with a gear wheel 50 which may be adapted to drive a fuel pump, a water pump, an oil pump and any other auxiliary equipment required. The crankshaft 42 also carries the flywheel 43 which may be connected to electric starter gearing which permits efficient starting of the generator without the use of auxiliary equipment which is required in known generators of this type.

The cylinder 1 may be water cooled by providing a series of ducts 51 (Fig. 1) in the casing thereof, through which water is pumped in any convenient manner.

Suitable bearings 52 (Fig. 1), for example thin-walled metal bushings, are provided at suitable positions throughout the generator. Lubrication of the bearings 52 is effected by oil which is pumped in, through valves 53, to oil reservoirs 54, and thence through numerous conduits 55 to the bearings.

To prevent loss of compression, sealing rings 56 are provided between the discs 12, 13 and the discs 24, 15, and between the discs 12, 13 and 24, 25 and their respective cylinder casings.

When the generator is to be used in a car or like vehicle, the turbine wheel 3 may be mounted on a stub shaft 58 which is secured to the cylinder 1, and may be connected to the drive shaft of the vehicle through a universal joint 59 and gearing 60. Alternatively, the generator may be mounted at one end of the vehicle and the turbine 3 at the opposite end, in which case suitable conduits may be provided to guide the exhaust gases from the exhaust ports to the turbine 3. In this manner the clutch, gearbox and change-speed mechanism of normal cars can be dispensed with and the horse-power is controlled by the throttle thereby providing a two-pedal car.

In an alternative construction illustrated in Figure 5, the disposition and operation of the main parts are substantially the same as those hereinbefore described. However, in this construction the pistons of the air compressor 2 are not driven directly by the pistons of the diesel cylinder 1, instead they are driven through the crank-shaft 42 (Fig. 5) which is a four-throw crank-shaft, two connecting rods of which are connected to the pistons of the cylinder 1 and the other two to the pistons of the cylinder 2.

I claim:
1. A gas generator comprising a first toroidal compression cylinder having a circular cross-section having first inlet ports for introducing air to the cylinder and first outlet ports, four first pistons having a cross-section for compressional engagement with the interior of said first cylinder and oscillatably disposed therein, a first member oscillatable about the axis of the toroidal cylinder, means connecting one pair of opposite pistons to said first member, a second member oscillatable about the axis of the toroidal cylinder, means connecting the other pair of opposite pistons to said second member, a second toroidal motor cylinder having second inlet and second outlet ports, there being passageways connecting the second inlet ports to the first outlet ports and the second outlet ports supplying the gas that is generated, four further pistons oscillatably disposed in the second cylinder, a third member oscillatable about the axis of the second toroidal cylinder, means connecting one pair of opposite further pistons to said third member, a fourth member oscillatable about the axis of the second toroidal cylinder, means connecting the other pair of opposite further pistons to said fourth member, connections for causing the third member to rock the first member and the fourth member to rock the second member, and four fuel injectors for injecting fuel one into each of the four combustion chambers formed in the second toroidal cylinder between adjacent ones of the four further pistons therein, said first toroidal cylinder having a toroidal circumference greater than the toroidal circumference of said second toroidal cylinder and said first pistons and toroidal cylinder having a compression capacity several times greater than the compression capacity of said further pistons and said second cylinder, and said first and second toroidal cylinders being coaxial with each other and the plane of said first toroidal cylin- der is spaced from the plane of said second toroidal cylinder.

2. A gas generator as claimed in claim 1, wherein there is one of said second inlet ports at one end of each of the four maximum spaces between adjacent further pistons and one of the second outlet ports at the opposite end of each such space.

3. A gas generator as claimed in claim 1, wherein said connections position the first-mentioned pistons in relation to the further pistons such that each second inlet port is uncovered by an associated further piston at the time the associated one of the first outlet ports communicates with a minimum cylinder volume between two first mentioned pistons.

4. A gas generator as claimed in claim 1, and further comprising a two-throw crankshaft having two pins, a flywheel connected to the crankshaft, a first connecting rod connecting said first and third members to one pin of the crankshaft, and a second connecting rod connecting said second and fourth members to the other pin of the crankshaft.

References Cited in the file of this patent

UNITED STATES PATENTS

| | | |
|---|---|---|
| 992,096 | Wright et al. | May 9, 1911 |
| 1,111,605 | Moss et al. | Sept. 22, 1914 |
| 1,809,577 | Wolff | June 9, 1931 |
| 2,127,743 | Linthwaite | Aug. 23, 1938 |
| 2,303,794 | Pateras Pescara | Dec. 1, 1942 |
| 2,565,272 | Sherman | Aug. 21, 1951 |

FOREIGN PATENTS

| | | |
|---|---|---|
| 718,627 | France | Nov. 5, 1931 |